United States Patent
Abhari et al.

(10) Patent No.: US 8,694,021 B2
(45) Date of Patent: Apr. 8, 2014

(54) APPENDING ADVERTISEMENTS TO SHORT MESSAGING SERVICE MESSAGES

(76) Inventors: Omar Abhari, Oak Forest, IL (US); Omar Aqel, Orland Park, IL (US)

(*) Notice: Subject to any disclaimer, the term of this patent is extended or adjusted under 35 U.S.C. 154(b) by 142 days.

(21) Appl. No.: 13/024,278

(22) Filed: Feb. 9, 2011

(65) Prior Publication Data

US 2012/0202533 A1  Aug. 9, 2012

(51) Int. Cl.
*H04W 24/00* (2009.01)
*H04W 88/06* (2009.01)
*H04W 92/02* (2009.01)
*H04W 88/02* (2009.01)

(52) U.S. Cl.
CPC .............. *H04W 88/06* (2013.01); *H04W 92/02* (2013.01); *H04W 88/02* (2013.01)
USPC ..................... 455/456.1; 455/466; 705/14.62; 705/16; 709/217; 709/232; 725/34

(58) Field of Classification Search
USPC ......... 455/456, 456.1, 456.3, 466; 705/14.62, 705/16; 725/34; 709/217, 232
See application file for complete search history.

(56) References Cited

U.S. PATENT DOCUMENTS

| | | | | |
|---|---|---|---|---|
| 6,097,961 | A * | 8/2000 | Alanara et al. | 455/466 |
| 6,728,548 | B1 * | 4/2004 | Willhoff | 455/466 |
| 6,901,263 | B2 * | 5/2005 | Gerner et al. | 455/456.1 |
| 7,051,351 | B2 * | 5/2006 | Goldman et al. | 725/34 |
| 7,080,130 | B2 * | 7/2006 | Aiso | 709/217 |
| 7,610,395 | B2 * | 10/2009 | Kawasaki et al. | 709/232 |
| 7,634,425 | B2 * | 12/2009 | Satomi et al. | 705/16 |
| 8,055,540 | B2 * | 11/2011 | Pudar | 705/14.62 |
| 8,068,856 | B2 * | 11/2011 | Kwon | 455/456.3 |
| 2003/0104821 | A1 * | 6/2003 | Gerner et al. | 455/456 |
| 2012/0202533 | A1 * | 8/2012 | Abhari et al. | 455/466 |

* cited by examiner

*Primary Examiner* — William D Cumming
(74) *Attorney, Agent, or Firm* — Richards Patent Law P.C.

(57) ABSTRACT

A system and method to append an advertisement to a Short Messaging Service (SMS) message. The system, which is implemented in a communication network with an SMS, includes two units, a first unit to identify a message recipient's subscription status to determine whether the recipient is subscribed to receive advertisement based SMS, and a second unit that appends an advertisement to the identified message before delivery to the message's recipient. First, the first unit identifies whether the intended recipient of an SMS message is subscribed to receive advertisement based SMS. Second, the first unit routes a request to the second unit to insert an advertisement into the identified SMS message. Third, the second unit appends an advertisement to the SMS message. Lastly, the second unit routes the modified message to the SMS in the network for delivery to the recipient's device.

10 Claims, 2 Drawing Sheets

APPENDING ADVERTISEMENTS TO SHORT MESSAGING SERVICE MESSAGES

BACKGROUND OF THE INVENTION

The present subject matter relates to delivery of advertisements through a Short Messaging Service (SMS) message. More specifically, the present invention relates to a device-independent system and method for appending advertisements in an existing SMS message before its delivery to a subscribed customer. Such a system may be implemented to reduce the overall cost of SMS to network service providers and users.

Traditionally, the cost for cellular telecommunication service has been high, especially in the United States, placing such service out of the reach of many people. The high cost still remains, if it is not increased by the cost, to obtain new devices compatible with the technology and system implemented within service provider's networks, which is not always compatible with the networks and systems utilized by other service providers. In many instances, the compatible devices are very expensive because they are equipped with additional technology necessary to support the new or advanced network features, thus further increasing the overall cost for service. Additionally, over the past few years, cellular telecommunications providers experienced a decline in the average rate per user (ARPU) for voice service over cellular telecommunications networks. The decline is attributed to the increase in use of data services (i.e., Short Messaging Service (SMS) and Multimedia Messaging Service (MMS)) over the same network. Messaging via SMS has become the most widely used data application in the world due to the ease of use and the standard communication protocols supporting the system. The use of these data services will continue to increase due to the increase the number of messages being sent. Service providers have increased the cost for service, in particular data service, to support the greater demand and capacity on the network, and to capitalize on the usage increase.

Service providers have attempted to alleviate the rising costs to consumers by seeking ways to reduce the overall cost and to make the services more attractive, while still allowing for an increase in the service providers' revenue. For many years, service providers have offered devices at little or no cost in exchange for signing an agreement to a long-term contract. However, for many people, a long-term contract translates to an additional or higher cost for service given the early termination fee and the length of financial commitment.

Moreover, service providers have be able to offer more affordable service but the reduction in cost has been incremental and has extended to those customers who are willing to commit to higher monthly plans, requiring higher usage of the service. This solution provides a lower unit cost based on usage however the aggregate cost of the plan still makes the service unaffordable and undesirable to those who are unable to reach a high usage rate that would make the financial commitment worthwhile. Providers have sought to attract customers and to maintain a competitive edge by offering special bundle and flat-rate billing plans through a combination of voice and data plans. Again, these solutions have only attracted some customers, but have not reduced the cost for all customers. Although service providers have gained more customers with these special plans, the ARPU for data service has still declined.

Even more recently, the development of prepaid cellular services and plans has attracted more customers, providing them with an option to receive cellular service at a lower rate as needed and without special features. With this solution, service providers have achieved higher usage rate in some demographical groups, but not all.

Service providers and third parties turned to direct advertising to cellular devices as a new way to produce revenue and to gain more customers. Advertising systems implemented on cellular systems have been achieved through the use of SMS and mobile internet/Wireless Access Protocol (WAP), where advertisements are distributed through videos, text messages, search and banner displays provided to cellular devices. The advertisement systems implemented through SMS are usually offered by third party businesses in exchange for reduced or free SMS service, or for other service features.

Of these advertisement systems, one common implementation is a broadcast approach, where an advertisement message is sent to several devices at once without interaction by the user through the device, where each user might or might not be registered to receive advertisements. The broadcast approach fails because the recipient might not expect the message or the quantity of messages therefore, the unexpected message(s) becomes burdensome and obtrusive to the recipient. Other systems follow an interactive approach, where each recipient has subscribed to the advertisement service and receives advertisements by interaction with a third party service to receive discount or service. Each recipient requests or responds to the service in exchange for an advertisement. This system avoids the burden and obtrusion of the broadcast approach and ensures a greater likelihood that the message will be read however, in order to receive the benefit, the user is burdened by the extra process or the receipt of additional messages. Additionally, these systems and the like are limited because the third parties, unlike network providers, have only limited access to subscriber profiles and usage information. Access to such information would allow the third party providers to tailor advertisements that are more meaningful or relevant. Further, both systems reduce the likelihood that the recipient will read the message because the burden and obtrusion produced make a recipient more likely to ignore the advertisement. While these current advertisement solutions have generated additional revenue, they fail because the burden from an additional registration process or method of interaction outweighs any benefit received, such as the reduction in service fees or the addition of greater service features. Thus, prior solutions have fallen short.

Accordingly, there is a need for a system that enables the delivery of advertisements integrated with an SMS without the need for specialized devices or third party processes to facilitate the delivery.

BRIEF SUMMARY OF THE INVENTION

The subject matter provided herein addresses these issues by providing methods and systems for appending advertisements to an SMS message. The system and method do not require any additional devices or special equipment, nor do they require the recipient of a message to engage in additional interaction with the recipient's device to obtain the message or the advertisement.

In one embodiment, the system and method for appending advertisements to an SMS message includes a message identification unit and an advertisement insertion unit. In use, a communication (sending) device sends an SMS message to another communication (recipient) device over a communication network (network) with an SMS. Before the network processes the request to deliver the message to the recipient device, it requests the message identification unit to determine whether the message's recipient is subscribed to receive SMS based advertisements.

Upon request from the network, the message identification unit identifies messages intended for advertisement subscribed recipients. Upon determining that the recipient of a message is subscribed, the unit routes a request to the advertisement insertion unit to insert an advertisement into the message.

Upon receipt of an identified message routed from the message identification unit, the advertisement insertion unit appends an advertisement to the identified message. Appending an advertisement involves incorporating an advertisement into the message delivery. Specific placement of the appended advertisement is determined by the message insertion unit. Various embodiments of the system and method may be configured to append the advertisement to the beginning of the message, at the end, anywhere in between or in multiple places within the delivered message or messages. After appending the advertisement to the message, the advertisement insertion unit returns control of the message to the network such that the modified message is delivered to the recipient device by the SMS.

In one contemplated embodiment, the advertisement insertion unit appends the advertisement to the message following two different approaches based on a determination of the total number of characters in the combination of the identified message and a selected advertisement. When the total number of characters of the message and advertisement is less than a predetermined character limit (for example, 160 characters or fewer), the insertion unit appends an advertisement to the message. However, when the total number of characters of the message and advertisement exceeds the predetermined character limit, the advertisement insertion unit breaks the message into at least two messages and an advertisement is appended to at least one of the new messages. In some embodiments, when space permits, the advertisement insertion unit appends a unique advertisement to each of the new messages. For the case when new messages are created, each new message will be individually routed to the SMS for delivery to the recipient such that each message is delivered in the proper sequence.

It is therefore an advantage of the systems and methods provided herein to deliver advertisements by appending advertisements to SMS messages prior to delivery of the messages.

It is yet another advantage of the systems and methods provided herein to provide telecommunication service at a reduced or subsidized cost through delivery of advertisements appended to SMS messages.

In addition, it is another advantage of the systems and methods provided herein to reduce the obtrusiveness of third party advertisements and to ensure advertisement delivery by providing them to subscribing users who expect the advertisements.

Further, it is an advantage of the systems and methods provided herein to enable network service providers to utilize demographic and behavioral information about network subscriber's to tailor distinct and personalized advertisements to them.

Still further, it is an advantage of the systems and methods provided herein to provide accurate accounting for advertisement delivery and return on investment through advertising integrated with the communication network's system, where accounting can be performed.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
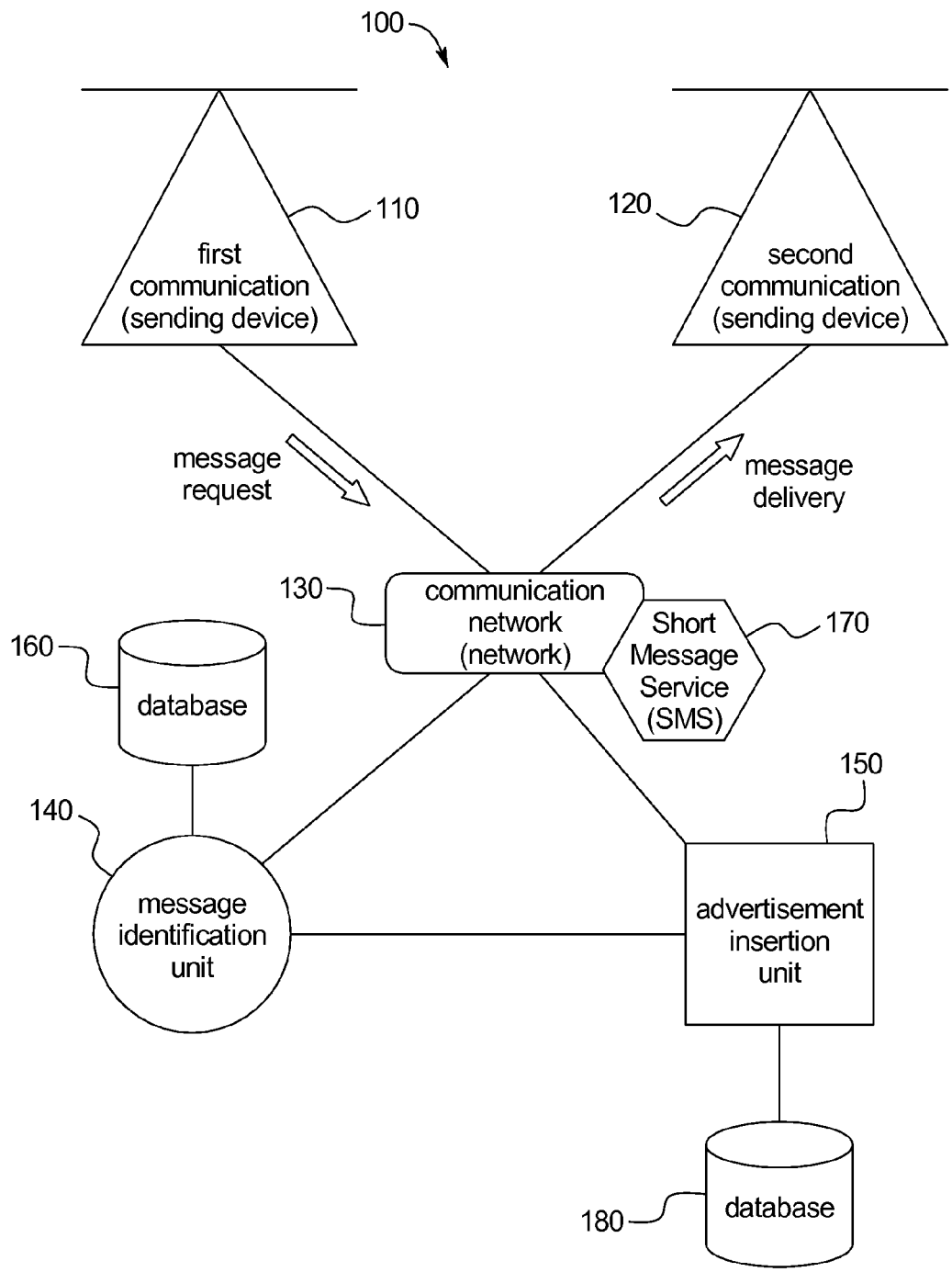
FIG. 1 is a block diagram illustrating a system for appending advertisements to SMS messages.

FIG. 1 illustrates a system 100 for appending advertisements to SMS messages, in accordance with an embodiment of the present invention. In the example shown, a sender operates a first communication (sending) device 110 to send an SMS message to a second communication (receiving) device 120. The sending device 110 and the receiving device 120 are also referred to herein as the communication devices 110 and 120. The sender's message request connects the sending device 110 to the communication network (network) 130 to deliver the message, via the SMS 170, to the receiving device 120. The receiving device 120 shown in FIG. 1 is configured to receive advertisements appended to incoming SMS messages.

Both the sending device 110 and the receiving device 120 are SMS enabled. Example communication devices 110 and 120 include phone, web and mobile communication devices, such as smartphones and similar devices, but it is understood that any SMS enabled communication device 110 and 120 may be used. For example, the sending device 110 may be a laptop computer and the receiving device 120 may be a mobile phone.

In the example shown in FIG. 1, the network 130 is responsible for the communications and functions between the communication devices 110 and 120. The network 130 shown in FIG. 1 may be any communication network 130 including an SMS 170. Accordingly, the general operation of the communication network 130 is understood by those of ordinary skill in the art. However, it is understood that the benefits of the subject matter disclosed herein may be realized using systems 100 implementing alternative architecture for the communication network 130.

For example, the communication network 130 shown in FIG. 1 is a cellular telecommunication network system, such as those commonly implemented by cellular network service providers. The communication network 130 is supported by a signaling network (such as a Signaling System Number (SS7) or other communication protocol based network) that employs the use of Short Messaging Service Centers (SMSC) and includes a series of cellular telecommunication network elements, none of which require additional modification for implementation of the system 100. The communication network 130 includes an SMS 170 including one of more SMSC's for delivering SMS messages. The operation of this type of communication network 130 and SMS 170 is understood by those skilled in the art.

Further, the communication devices 110 and 120 may be configured to receive service from different service providers, each of which may implement differing architecture for their associated communication network 130. Therefore it is understood that the communication network 130, as referred to herein, may include any combination of one or more communication network architectures and elements and that various portions of the of the communication network 130 may be provided by distinct service providers, each of which is in communication with the others.

In the embodiment shown in FIG. 1, a user sends an SMS message from the sending device 110 to the receiving device 120. The message sent by the sending device 110 is referred to herein as a Mobile Originating (MO) message. The message received by the receiving device 120 is referred to herein as the Mobile Terminating (MT) message. The communication network 130 stores the MO message in an SMSC within the communication network 130, which handles delivery of this message. In one contemplated embodiment, the SMSC is associated with a message identification unit 140. Alternatively, the message identification unit 140 may be implemented in an SMS gateway, a secondary SMSC, a messaging routing server, or the like.

As shown in FIG. 1, the message identification unit 140 is in communication with an advertisement insertion unit 150, each of which is in communication with the network 130. It is understood that in certain embodiments of the system 100 the message identification unit 140 and advertisement insertion unit 150 may be embodied in a single element that performs both functions and, accordingly, the distinction between the two is merely for clarity of the description provided herein.

The message identification unit 140 identifies MO messages to which advertisements are to be appended. Upon identification of an MO message to which one or more advertisements are to be appended, the message identification unit 140 routes the MO message to the advertisement insertion unit 150, which appends an advertisement to the identified MO message to create one or more MT messages, as described further herein. After the one or more MT messages are created, the advertisement insertion unit 150 communicates the one or more MT messages to the communication network 130 for delivery to the receiving device 120. For example, the advertisement insertion unit 150 may return control to the originating SMSC that received the MO message and the SMSC delivers to the receiving device 120 according to standard SMS function by the network 130.

As described above, the message identification unit 140 identifies messages to which advertisements are to be appended. For example, the message identification unit 140 may identify an MO message to which to append one or more advertisements by determining whether the receiving device 120 is subscribed to receive SMS advertisements in consideration for reduced service fees. In such case, the message identification unit 140 determines the recipient device's subscription status by retrieving information from an associated database 160. However, it is contemplated that there are numerous conditions that may be used to determine whether a given MO message is to be appended with one or more advertisements. For example, in contemplated embodiments, the status of the sending device 110 may be used. In other situations, the content of the MO message may relevant in determining whether a given MO message is to be appended with one or more advertisements.

In the example shown in FIG. 1, the message identification unit 140 is connected to the associated database 160, which stores customer and device data pertaining to subscription profiles, preferences, etc. For example, the customer and device data may include information identifying whether a receiving device 120 is subscribed to receive advertisements via SMS. Additionally, the database 160 may include demographic and/or preference information providing information that allows advertisements to be specifically targeted to a recipient's interests or preferences. In other embodiments, the database 160 may be any other device or hardware that is accessible by the message identification unit 140 and capable of storing and/or communicating customer and device data. It is understood that the embodiment of the system 100 shown in FIG. 1 and including a database 160 is merely one example of the system 100 adapted to provided the benefits of the subject matter disclosed herein and that versions of the system 100 may be provided that do not include a database 160. For example, relevant information and data may be provided within the message request to the message identification unit 140.

As noted above, upon identification of an MO message to which to append one or more advertisements, the message identification unit 140 routes the message to the advertisement insertion unit 150. The advertisement insertion unit 150 then appends advertisements to identified messages. The appending process may include the insertion of an advertisement in a single SMS message or it may include dividing the MO message into two or more messages into which one or more advertisements are appended. As used herein, appending advertisements to messages, or message parts, relates to the insertion of advertisements either at the front or the end of a message, or message part. The specific placement of the advertisement may be determined by the advertisement insertion unit 150 or other elements of the system 100. An illustrative example in which the advertisement insertion unit 150 appends one or more advertisements to the identified message based on using character limits as a decision mechanism is provided below.

In this example, the advertisement insertion unit 150 receives an MO message from the message identification unit 140. The advertisement insertion unit 150 then retrieves at least one advertisement from the database 160. The selection and retrieval of the advertisement may be based on any criteria, for example, the user preferences or demographic information associated with the receiving device 120 or the content of the MO message. It is contemplated that the selection and retrieval of the advertisement may occur earlier in the process or may be performed by another element of the system 100. For example, in some instances, the message identification unit 140 may select and retrieve the advertisement and communicate it to the advertisement insertion unit 150 along with the MO message.

Once the MO message and selected advertisement are identified and/or selected, the advertisement insertion unit 150 appends the advertisement to the MO message to create the MT message. In instances in which the combined length of the MO message and the selected advertisement to be appended are under the maximum character length for an SMS message, the MT message may simply be a combination of the two. However, in instances in which the combined length of the MO message and the advertisement exceeds the maximum character length for an SMS message, the advertisement insertion unit 150 breaks the MO message into two or more message parts (depending on the character length) and then appends the advertisement to one or more of the message parts. For example, assuming the maximum character length is 160 characters, the MO message is 145 characters and the selected advertisement length is 30 characters, the advertisement insertion unit 150 may break the MO message into two message parts of 75 and 70 characters, respectively, and append the selected advertisement to either or both message parts. Similarly, if the MO message is 350 characters and the selected advertisement is 30 characters, the advertisement insertion unit 150 may break the MO message into the message parts of 120, 115 and 115 characters, respectively, and append the selected advertisement to any one or more of the message parts.

In some instances, the advertisement insertion unit 150 may be adapted to identify optimal break points for separating an MO message into two or more message parts. For example, the advertisement insertion unit 150 may look for predetermined punctuation to use as a break point (e.g., separate message parts after a period when possible). Alternatively, the message parts may be separated in any other suitable manner.

Further, in some instances, the separation of an MO message into multiple message parts may allow the advertisement insertion unit 150 to select multiple advertisements or groups of advertisements to insert be into one of the message a parts. Accordingly, a MO message that gets broken into two message parts may have a different advertisement (or group of advertisements) appended to each message part.

Moreover, it is contemplated that the division of the MO message into multiple parts may occur prior to the selection of advertisements. For example, the advertisement insertion unit 150 may divide any MO message over some predetermined character length into multiple parts and then select advertisements (or groups of advertisements) to be appended to each message part. For example, the advertisement insertion unit 150 may divide any MO message having a length greater than 50 characters into multiple message parts. Accordingly, an MO message of 90 characters may be split into two message parts, the first 50 characters and the second 40 characters. As a result, each message part has a large number of characters available for the insertion of advertisements.

As can be seen, knowing the predetermined character limit of the SMS message is important to the function of the advertisement insertion unit 150. The predetermined character limit of the SMS message is the maximum number of characters allowed for an SMS message handled by the SMS 170 in the network 130. The predetermined character limit depends on the network specification and constraints of the signaling protocol utilized by the network 130 for SMS communication. The maximum supported character length for an SMS message varies depending on the data coding scheme employed for the network's 130 design. The devices compatible with the network 130 are coded with a particular alphabet that serves as the coding scheme, which defines the maximum number of characters in a message. For example, in a network employing a Global System for Mobile Communications (GSM) system, a common network design utilized by network providers in the United States, if a GSM 7-bit alphabet scheme is used, then the maximum length is 160 characters. In the case of an 8-bit alphabet scheme, then the maximum length is 140 characters. Accordingly, it is understood that the maximum length of the SMS message may be dependent on numerous factors within the system 100 and may vary by system 100.

Once the one or more advertisements are appended to the MO message, or to the multiple message parts, to create the MT message(s), the MT message(s) are provided to the communication network 130 for delivery to the receiving device 120. For the case when multiple MT messages are produced, each MT message is routed to the communication network 130 for individual delivery to the recipient in the appropriate order.

While the examples provided above describe the various elements of the network 130 as distinct elements, it is understood that various combinations of elements described herein (for example the message identification unit 140, the advertisement insertion unit 150 and the database 160) may be provided in a single element based on the architecture of the network 130 implemented.

It is further contemplated that the system 100 and method 200 provided herein may provide for improved methods of accounting for advertisement delivery and return on investment due to the integration of the advertising delivery into the communication network 100. The collection, storage and/or analysis of the advertisement delivery information may be used improving accounting functionality.

Figure 2:
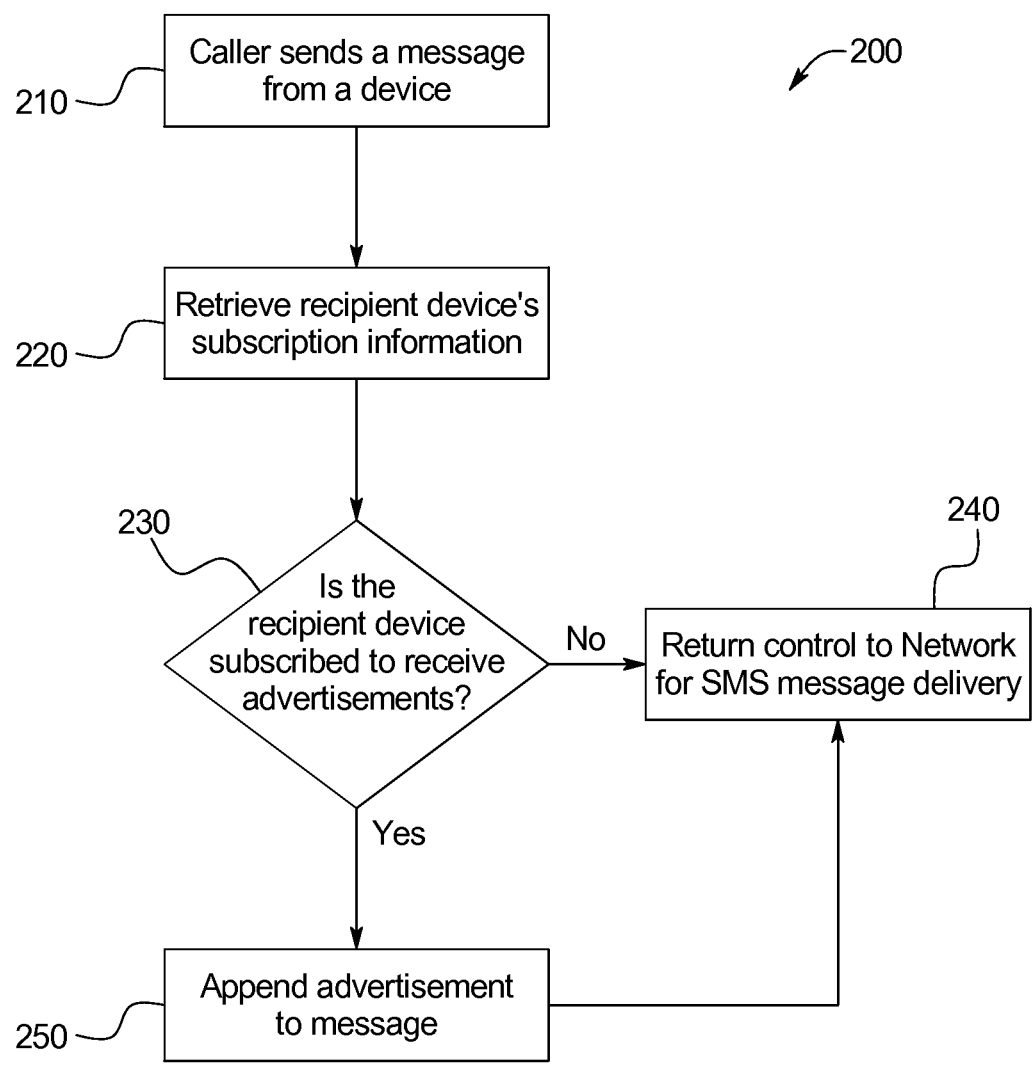
FIG. 2 is a flow diagram illustrating a method for appending advertisements to SMS messages.

FIG. 2 is a flow diagram illustrating a method 200 for appending an advertisement to an SMS message before its delivery, where the message is sent from the sending device 110 to the receiving device 120 over a communication network 130. The method 200 may be implemented, for example, in conjunction with the system 100 embodied in and described with respect to FIG. 1.

Referring now to FIG. 2, in the first step (step 210) a user sends an SMS message to the receiving device 120. The second step (step 220) is to identify whether an advertisement is to be appended to the SMS message. As described above, the receiving device 120 may be subscribed to receive advertisements appended to SMS messages in exchange for reduced service fees. Alternatively, there may be other criteria for determining which SMS messages are to be appended with SMS messages. As shown in step 230, if the SMS message is not to be appended with an advertisement, the next step (step 240) is to deliver the SMS message to the receiving device 120. Alternatively, if the SMS message is to be appended with an advertisement, the next step (step 250) is to append one or more advertisements to the SMS message as described above with respect to the system 100, which may include the division of the original SMS message into multiple message parts and the appending of one or more advertisements to the multiple message parts. Once the advertisement has been appended to the SMS message, the next step (step 240) is to deliver the SMS message to the receiving device 120.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An advertisement delivery system comprising:
   a message identification unit in communication with a database, wherein the database includes data identifying one or more cellular devices that are subscribed to receive advertisements;
   wherein, in response to receiving a short messaging service message from a first cellular device to be routed to a first connection, the message identification unit accesses the database and determines whether the first cellular device is subscribed to receive advertisements;
   wherein, when the first cellular device is subscribed to receive advertisements, the message identification unit retrieves an advertisement from a advertisement insertion unit, wherein the advertisement insertion unit appends the advertisement to the short messaging service message from the first cellular device, and, routes the short messaging service message including the appended advertisement to the first connection; and wherein, when the first cellular device is not subscribed to receive advertisements, the message identification unit routes the short messaging service message from the first cellular device to the first connection, wherein the database further includes user demographic information, and wherein the advertisement insertion unit retrieves an advertisement associated with the user demographic information.

2. The system of claim 1 wherein the message identification unit is adapted to identify the number of characters in the short messaging service message, wherein when the number of characters identified is above a predetermined limit, the advertisement insertion unit splits the short messaging service message into a plurality of messages, wherein at least one of the plurality of messages includes the appended advertisement.

3. The system of claim 1 wherein the database further includes device preference information.

4. The system of claim 3 wherein the advertisement insertion unit retrieves an advertisement associated with the device preference information.

5. The system of claim 1 wherein the advertisement is a text message advertisement delivered through the cellular device's text service.

6. An advertisement delivery method comprising:

receiving, in a message identification unit, a short messaging service message from a first cellular device to connect with a first connection, wherein the message identification unit is in communication with a database, wherein the database includes data identifying one or more cellular devices that are subscribed to receive advertisements; wherein the message identification unit is configured to:

access the database to determine whether the first cellular device is subscribed for advertisement deliver;

when the first cellular device is subscribed to receive advertisements, retrieve an advertisement from an advertisement insertion unit, append the advertisement to the short messaging service message, and connect the short messaging service message including the appended advertisement to the first connection;

when the first cellular device is not subscribed to receive advertisements, connect the short messaging service message from the first cellular device to the first connection, wherein the database further includes user demographic information, and wherein the advertisement insertion unit retrieves an advertisement associated with the user demographic information.

7. The method of claim 6 wherein the message identification unit is adapted to identify the number of characters in the short messaging service message, wherein when the number of characters identified is above a predetermined limit, the advertisement insertion unit splits the short messaging service message into a plurality of messages, wherein at least one of the plurality of messages includes the appended advertisement.

8. The method of claim 6 wherein the wherein the database further includes device preference information.

9. The method of claim 8 wherein the advertisement insertion unit is configured to retrieve an advertisement associated with the device preference information.

10. The method of claim 6 wherein the advertisement is an text message advertisement delivered through the cellular device's text service.

* * * * *